United States Patent [19]

Prehn

[11] 4,182,929
[45] Jan. 8, 1980

[54] CIRCUIT FOR SIMULATING THE SCRAMBLING OF AN ELECTROMECHANICAL ROTOR

[76] Inventor: Lawrence D. Prehn, Madison St., Gillette, N.J. 07933

[21] Appl. No.: 656,731

[22] Filed: May 2, 1957

[51] Int. Cl.$^2$ ............................................. H04L 1/00
[52] U.S. Cl. ............................................ 178/22; 35/4
[58] Field of Search ................ 35/4; 179/1.5; 178/22, 178/79; 340/348, 356, 345; 197/4; 116/18

[56] References Cited

U.S. PATENT DOCUMENTS

| | | | |
|---|---|---|---|
| 1,472,775 | 10/1923 | Wahnoe | 35/4 |
| 1,533,252 | 4/1925 | Koch | 35/4 |
| 1,584,660 | 5/1926 | Scherbires | 35/4 |
| 2,055,702 | 9/1936 | Patton | 35/4 |
| 2,424,998 | 5/1947 | Nyquist | 179/1.5 R |
| 2,517,587 | 8/1950 | Mohr | 179/1.5 R |
| 2,518,458 | 8/1950 | Friedman | 35/4 |
| 2,767,312 | 10/1956 | Toulon | 328/105 |
| 2,783,374 | 2/1957 | Newman | 328/94 |

FOREIGN PATENT DOCUMENTS

550796 5/1932 Fed. Rep. of Germany ............. 178/22
479854 2/1938 United Kingdom .

Primary Examiner—Howard A. Birmiel
Attorney, Agent, or Firm—John R. Utermohle

EXEMPLARY CLAIM

1. A circuit for simulating the scrambling of an electromechanical rotor of the type wherein an input to an input contact on one side of the rotor appears on one of a plurality of output contacts on the other side of the rotor in accordance with the wiring among the contacts and with the position of the rotor, which comprises first and second pluralities of switching circuits, means connecting the two pluralities of switching circuits in a manner dictated by the wiring between the input and output contacts of the rotor being simulated, means for applying an input to the first plurality of switching circuits, means for energizing a predetermined switching circuit in each plurality of switching circuits, and means for withdrawing an output from one of the second plurality of switching circuits.

8 Claims, 8 Drawing Figures

CIRCUIT FOR SIMULATING THE SCRAMBLING OF AN ELECTROMECHANICAL ROTOR

This invention relates to the cryptographic art, and specifically, it comprises an electronic apparatus and method through which the operation of one or more electromechanical cryptographic rotors can be duplicated.

Cryptographic rotors are old and well known in the art (see, for example, U.S. Pat. No. 1,683,072 to Hebern, granted Sept. 4, 1928). Usually, such rotors are used in series, and they commonly are stepped periodically in meter fashion thereby to modify the electrical paths therethrough.

One object of the present invention is to provide an extremely high-speed apparatus for mixing electrical signals.

Another object is to provide an electronic apparatus which will duplicate the functions of a mechanical rotor system, but which will operate at much higher speeds than can be attained mechanically.

A further object is to provide an apparatus which is free from mechanically moving parts, and which will simulate the action of one or more cryptographic rotors.

Another object is to provide an electronic device for simulating the action of cryptographic rotors wherein the manner of "stepping" the "rotors" may be quickly and easily changed.

Other objects will be apparent from a reading of the following specification and claims.

The invention may be used to simulate the operation of any number of cryptographic rotors, wired in any desired fashion and having any number of contacts. In order to simplify the description, however, it will be assumed that the mechanical apparatus to be replaced by the invention consists of but two rotors, each with five input contacts and five output contacts.

Figure 1:
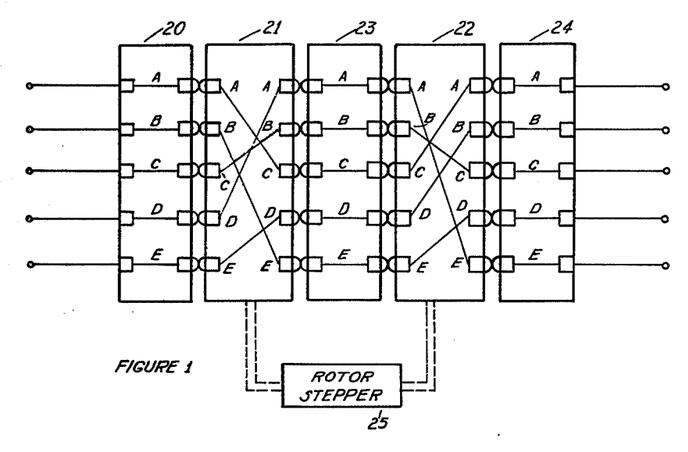
FIG. 1 illustrates in diagram a conventional cryptographic rotor system including two rotors.

Referring to the drawings and particularly to FIG. 1, the numeral 20 represents, in the electromechanical device shown therein, an end plate or stator which serves as an input to a rotor system which includes two cryptographic rotors, designated 21 and 22. A further stator 23 is located between the two rotors 21 and 22 and a further end plate 24 handles the output of the system. The rotor 21 has five input contacts A, B, C, D and E and five output contacts, likewise identified as A, B, C, D and E, and such input-output contacts are wired A to C, B to E, C to B, D to A and E to D. Rotor 22, similarly constructed, is wired A to E, B to C, C to A, D to B and E to D. The stators 20, 23 and 24 are wired straight through, although it will be understood that these can be cross wired if desired.

The rotors in FIG. 1 are shown in their initial positions, with their A contacts aligned with the A contacts of the stators. It will be seen that a signal on input contact A of the stator 20 will follow a path through the stator 20 to the input contact A of the rotor 21, to the output contact C of the rotor 21, through the stator 23, to the input contact C of the rotor 22, to the output contact A of the rotor 22, to the input contact A of the stator 24, and to the output contact A of the stator 24. By tracing the other wiring, it can be seen that, with the rotors fixed in the relations shown in FIG. 1, B, C, D, E will be enciphered as D, C, E, B, respectively.

A means designated 25 is shown for stepping the rotors. Normally, the stepping sequence of the rotors is such that the rotor 22 will step once, that is, will turn through one-fifth of a cycle, for each complete revolution of the rotor 21.

The electronic system of FIGS. 3 through 7 is intended, as has been stated, to reproduce the effects of a series of mechanical cryptographic rotors, and, as previously mentioned, the following description will be directed to the duplication of the effects of the system of FIG. 1.

Figure 3:
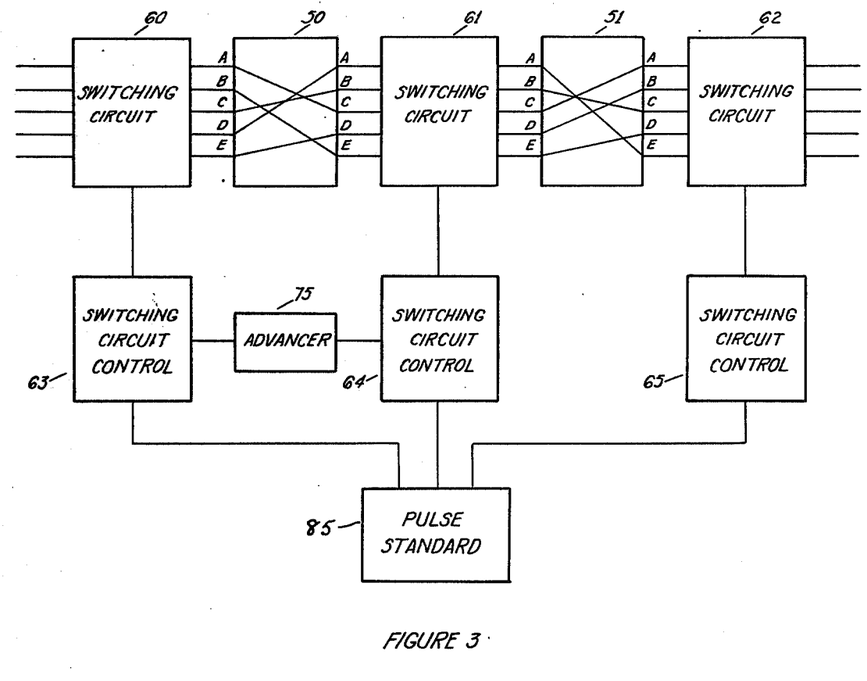
FIG. 3 is a block diagram of the electronic system of my invention.

With reference now particularly to FIG. 3, the numeral 50 designates connecting block which may hereinafter be termed a terminal strip or a permutation terminal strip. The block is wired just as the rotor 21 of FIG. 1 is wired. A second block 51 is wired by duplicating the wiring of the rotor 22 of FIG. 1. Although not all of the wiring is shown in this figure, the terminal strips 50 and 51 provide circuits between every input of one switching circuit, and every input of the next; they include, in other words, every circuit that can be established through the stepping of the rotors of FIG. 1.

Whereas, in the mechanical construction of FIG. 1, the rotors are physically displaced with respect to each other and the stators, the present invention relies for similar effects upon a plurality of circuits with rapid switching from one to the other.

Three switching circuits 60, 61 and 62 are utilized, and they serve to vary the electrical paths through the system. Three switching-circuit controls 63, 64 and 65 cooperate with the switching circuits to determine, in some prearranged order, the energization of the individual switching circuits. The three switching circuits are identical, and the control circuits are substantially identical.

Figure 4:
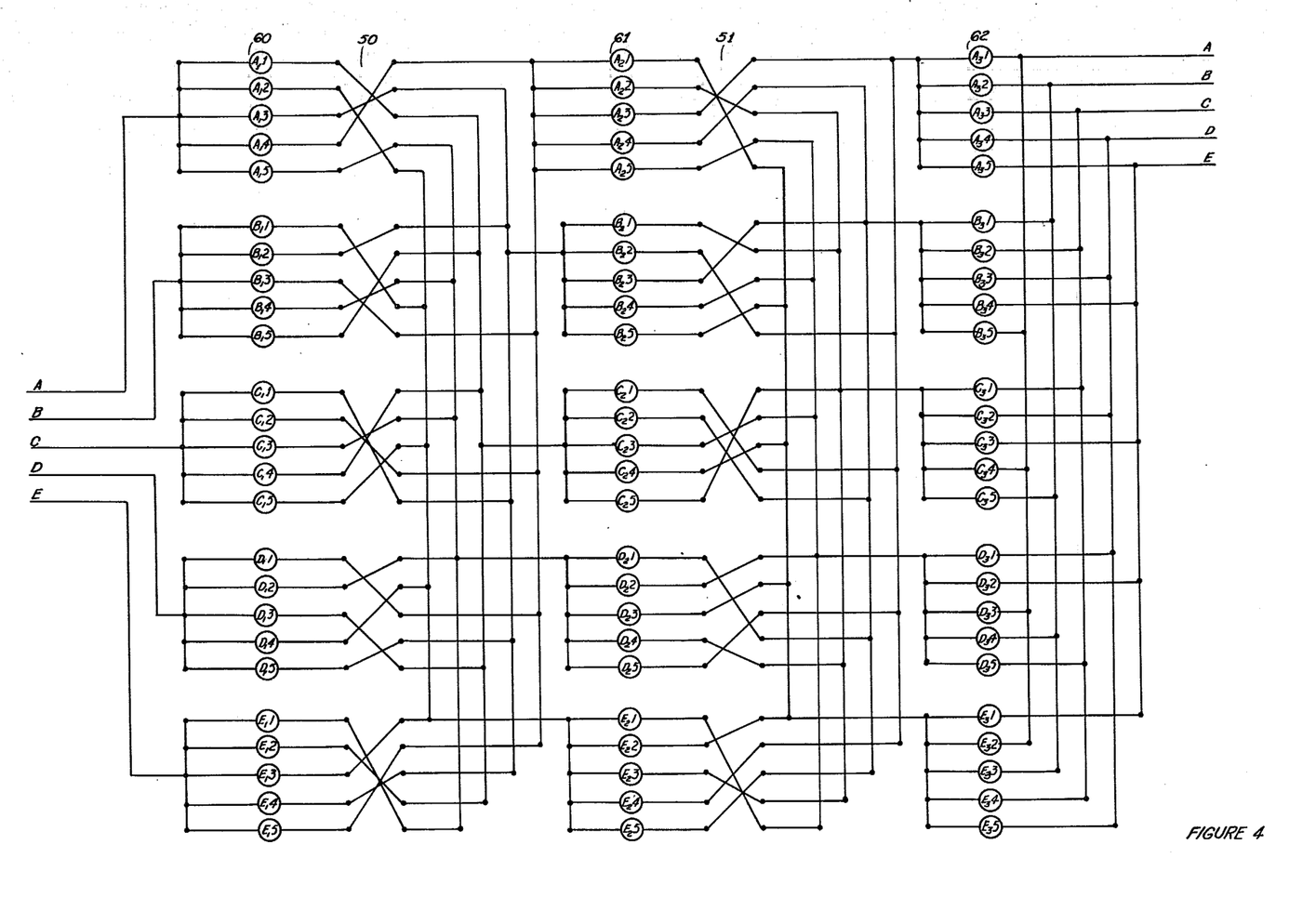
FIG. 4 is a schematic diagram of certain switching circuits utilized in the invention.

According to the showing of FIG. 4, the invention contemplates the breaking down of each input into five channels. The number of channels will be determined by the number of different characters to be treated. Usually, there will be ten channels if numerals are used, or twenty-six if a normal English alphabet is utilized, for each input.

An input signal will be applied simultaneously to the five channels. Each channel contains one vacuum tube circuit which acts as a switch. Each group of five channels will hereinafter be referred to as a stage. An apparatus, to replace a bank of n rotors having five contacts each, will contain n systems of five stages with five vacuum tubes each. In FIG. 4, the stages are identified as A, B, C, D, and E. Should it be desired to simulate the action of ten-contact rotors, n systems of ten stages each of ten vacuum tubes would be required.

Every tube in the several stages is normally nonconducting and presents an open circuit to input current. The various control circuits, however, so control the switching circuits as to cause one tube at a time in each stage to conduct, the sequence of activation depending upon the design of the respective control circuits.

Assume that at a particular instant in switching circuit 60, tubes $A_11$, $B_11$, $C_11$, $D_11$ and $E_11$ are conducting. Assume also that, in switching circuit 61, tubes $A_21$, $B_21$, $C_21$, $D_21$ and $E_21$ are conducting, and that, in switching circuit 62, tubes $A_31$, $B_31$, $C_31$, $D_31$ and $E_31$ are conducting.

The paths of current from the inputs through the system to the outputs will be as follows: Input A is transferred through $A_11$, permutation terminal strip 50, input C of stepping circuit 61, through $C_21$, permutation terminal strip 51, input A of stepping circuit 62, $A_31$, and to output A, thus giving A as the enciphered equivalent of A. An examination of the circuits of FIG. 3 will show that the enciphered equivalents of B through E will be D, C, E, and B, respectively, and thus that one condition of the mechanical apparatus of FIG. 1 has been duplicated.

Similarly, assume an instant when the following tubes are conducting: $A_13$, $B_13$, $C_13$, $D_13$, and $E_13$ in switching circuit 60; $A_22$, $B_22$, $C_22$, $D_22$, and $E_22$ in switching circuit 61; and $A_33$, $B_33$, $C_33$, $D_33$, and $E_33$ of switching circuit 62. Under these circumstances, if the A input is energized, an electrical path is completed through $A_13$ of circuit 60, through $B_22$ of switching circuit 61, through $A_33$ of switching circuit 62, to output C. The letters B through E would be enciphered under these conditions as E, A, D, B. This is the same encipherment as would be achieved by the rotor system of FIG. 1 with the C contacts of rotor 21 and the D contacts of rotor 22 aligned with the A contacts of the stators.

All other conditions of the mechanical rotor system can be similarly duplicated through the circuits of FIG. 4.

Figure 2:
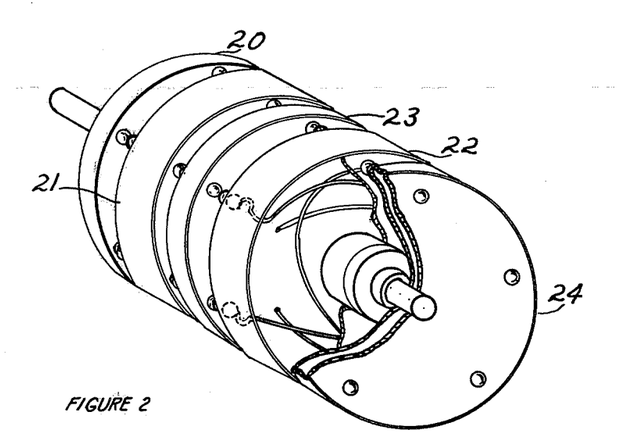
FIG. 2 is an isometric view of a mechanical system similar to that of FIG. 1, portions of the elements being broken away, and the rotor stepper being omitted.

The following table indicates the several rotor alignments possible with the structure of FIGS. 1 and 2, the resulting encipherments of the expression A, B, C, D, E, and the order in which the tubes of the switching control circuits must conduct to produce like results through the use of this invention.

| Rotor Alignments | Input Contacts | Circuits Established | Output Contacts | Firing Order |
|---|---|---|---|---|
| A A | A | $A_11 - C_21 - A_31$ | A | 111 |
| | B | $B_11 - E_21 - D_31$ | D | |
| | C | $C_11 - B_21 - C_31$ | C | |
| | D | $D_11 - A_21 - E_31$ | E | |
| | E | $E_11 - D_21 - B_31$ | B | |
| B A | A | $A_12 - E_25 - B_31$ | B | 251 |
| | B | $B_12 - B_25 - E_31$ | E | |
| | C | $C_12 - A_25 - D_31$ | D | |
| | D | $D_12 - D_25 - A_31$ | A | |
| | E | $E_12 - C_25 - C_31$ | C | |
| C A | A | $A_13 - B_24 - D_31$ | D | 341 |
| | B | $B_13 - A_24 - B_31$ | B | |
| | C | $C_13 - D_24 - C_31$ | C | |
| | D | $D_13 - C_24 - E_31$ | E | |
| | E | $E_13 - E_24 - A_31$ | A | |
| D A | A | $A_14 - A_23 - A_31$ | A | 431 |
| | B | $B_14 - D_23 - E_31$ | E | |
| | C | $C_14 - C_23 - D_31$ | D | |
| | D | $D_14 - E_23 - C_31$ | C | |
| | E | $E_14 - B_23 - B_31$ | B | |
| E A | A | $A_15 - D_22 - D_31$ | D | 521 |

-continued

| Rotor Alignments | Input Contacts | Circuits Established | Output Contacts | Firing Order |
|---|---|---|---|---|
| | B | $B_15 - C_22 - B_31$ | B | |
| | C | $C_15 - E_22 - E_31$ | E | |
| | D | $D_15 - B_22 - A_31$ | A | |
| | E | $E_15 - A_22 - C_31$ | C | |
| A B | A | $A_11 - C_22 - B_35$ | A | 125 |
| | B | $B_11 - E_22 - E_35$ | D | |
| | C | $C_11 - B_22 - A_35$ | E | |
| | D | $D_11 - A_22 - C_35$ | B | |
| | E | $E_11 - D_22 - D_35$ | C | |
| B B | A | $A_12 - E_21 - D_35$ | C | 215 |
| | B | $B_12 - B_21 - C_35$ | B | |
| | C | $C_12 - A_21 - E_35$ | D | |
| | D | $D_12 - D_21 - B_35$ | A | |
| | E | $E_12 - C_21 - A_35$ | E | |
| C B | A | $A_13 - B_25 - E_35$ | D | 355 |
| | B | $B_13 - A_25 - D_35$ | C | |
| | C | $C_13 - D_25 - A_35$ | E | |
| | D | $D_13 - C_25 - C_35$ | B | |
| | E | $E_13 - E_25 - B_35$ | A | |
| D B | A | $A_14 - A_24 - B_35$ | A | 445 |
| | B | $B_14 - D_24 - C_35$ | B | |
| | C | $C_14 - C_24 - E_35$ | D | |
| | D | $D_14 - E_24 - A_35$ | E | |
| | E | $E_14 - B_24 - D_35$ | C | |
| E B | A | $A_15 - D_23 - E_35$ | D | 535 |
| | B | $B_15 - C_23 - D_35$ | C | |
| | C | $C_15 - E_23 - C_35$ | B | |
| | D | $D_15 - B_23 - B_35$ | A | |
| | E | $E_15 - A_23 - A_35$ | E | |
| A C | A | $A_11 - C_23 - D_34$ | B | 134 |
| | B | $B_11 - E_23 - C_34$ | A | |
| | C | $C_11 - B_23 - B_34$ | E | |
| | D | $D_11 - A_23 - A_34$ | D | |
| | E | $E_11 - D_23 - E_34$ | C | |
| B C | A | $A_12 - E_22 - E_34$ | C | 224 |
| | B | $B_12 - B_22 - A_34$ | D | |
| | C | $C_12 - A_22 - C_34$ | A | |
| | D | $D_12 - D_22 - B_34$ | B | |
| | E | $E_12 - C_22 - B_34$ | E | |
| C C | A | $A_13 - B_21 - C_34$ | A | 314 |
| | B | $B_13 - A_21 - E_34$ | C | |
| | C | $C_13 - D_21 - B_34$ | E | |
| | D | $D_13 - C_21 - A_34$ | D | |
| | E | $E_13 - A_21 - D_34$ | B | |
| D C | A | $A_14 - A_25 - D_34$ | B | 454 |
| | B | $B_14 - D_25 - A_34$ | D | |
| | C | $C_14 - C_25 - C_34$ | A | |
| | D | $D_14 - E_25 - B_34$ | E | |
| | E | $E_14 - B_25 - E_34$ | C | |
| E C | A | $A_15 - D_24 - C_34$ | A | 544 |
| | B | $B_15 - C_24 - E_34$ | C | |
| | C | $C_15 - E_24 - A_34$ | D | |
| | D | $D_15 - B_24 - D_34$ | B | |
| | E | $E_15 - A_24 - B_34$ | E | |
| A D | A | $A_11 - C_24 - E_33$ | B | 143 |
| | B | $B_11 - E_24 - A_33$ | C | |
| | C | $C_11 - B_24 - D_33$ | A | |
| | D | $D_11 - A_24 - B_33$ | D | |
| | E | $E_11 - D_24 - C_33$ | E | |
| B D | A | $A_12 - E_23 - C_33$ | E | 233 |
| | B | $B_12 - B_23 - B_33$ | D | |
| | C | $C_12 - A_23 - A_33$ | C | |
| | D | $D_12 - D_23 - E_33$ | B | |
| | E | $E_12 - C_23 - D_33$ | A | |
| C D | A | $A_13 - B_22 - A_33$ | C | 323 |
| | B | $B_13 - A_22 - C_33$ | E | |
| | C | $C_13 - D_22 - D_33$ | A | |
| | D | $D_13 - C_22 - B_33$ | D | |
| | E | $E_13 - E_22 - E_33$ | B | |
| D D | A | $A_14 - A_21 - E_33$ | B | 413 |
| | B | $B_14 - D_21 - B_33$ | D | |
| | C | $C_14 - C_21 - A_33$ | C | |
| | D | $D_14 - E_21 - D_33$ | A | |
| | E | $E_14 - B_21 - C_33$ | E | |
| E D | A | $A_15 - D_25 - A_33$ | C | 553 |
| | B | $B_15 - C_25 - C_33$ | E | |
| | C | $C_15 - E_25 - B_33$ | D | |
| | D | $D_15 - B_25 - E_33$ | B | |
| | E | $E_15 - A_25 - D_33$ | A | |
| A E | A | $A_11 - C_25 - C_32$ | D | 152 |

-continued

| Rotor Alignments | Input Contacts | Circuits Established | Output Contacts | Firing Order |
|---|---|---|---|---|
|  | B | $B_11 - E_25 - B_32$ | C |  |
|  | C | $C_11 - B_25 - E_32$ | A |  |
|  | D | $D_11 - A_25 - D_32$ | E |  |
|  | E | $E_11 - D_25 - A_32$ | B |  |
| B E | A | $A_12 - E_24 - A_32$ | B | 242 |
|  | B | $B_12 - B_24 - D_32$ | E |  |
|  | C | $C_12 - A_24 - B_32$ | C |  |
|  | D | $D_12 - D_24 - C_32$ | D |  |
|  | E | $E_12 - C_24 - E_32$ | A |  |
| C E | A | $A_13 - B_23 - B_32$ | C | 332 |
|  | B | $B_13 - A_23 - A_32$ | B |  |
|  | C | $C_13 - D_23 - E_32$ | A |  |
|  | D | $D_13 - C_23 - D_32$ | E |  |
|  | E | $E_13 - E_23 - C_32$ | D |  |
| D E | A | $A_14 - A_22 - C_32$ | D | 422 |
|  | B | $B_14 - D_22 - D_32$ | E |  |
|  | C | $C_14 - C_22 - B_32$ | C |  |
|  | D | $D_14 - E_22 - E_32$ | A |  |
|  | E | $E_14 - B_22 - A_32$ | B |  |
| E E | A | $A_15 - D_21 - B_32$ | C | 512 |
|  | B | $B_15 - C_21 - A_32$ | B |  |
|  | C | $C_15 - E_21 - D_32$ | E |  |
|  | D | $D_15 - B_21 - C_32$ | D |  |
|  | E | $E_15 - A_21 - E_32$ | A |  |

Figure 5:
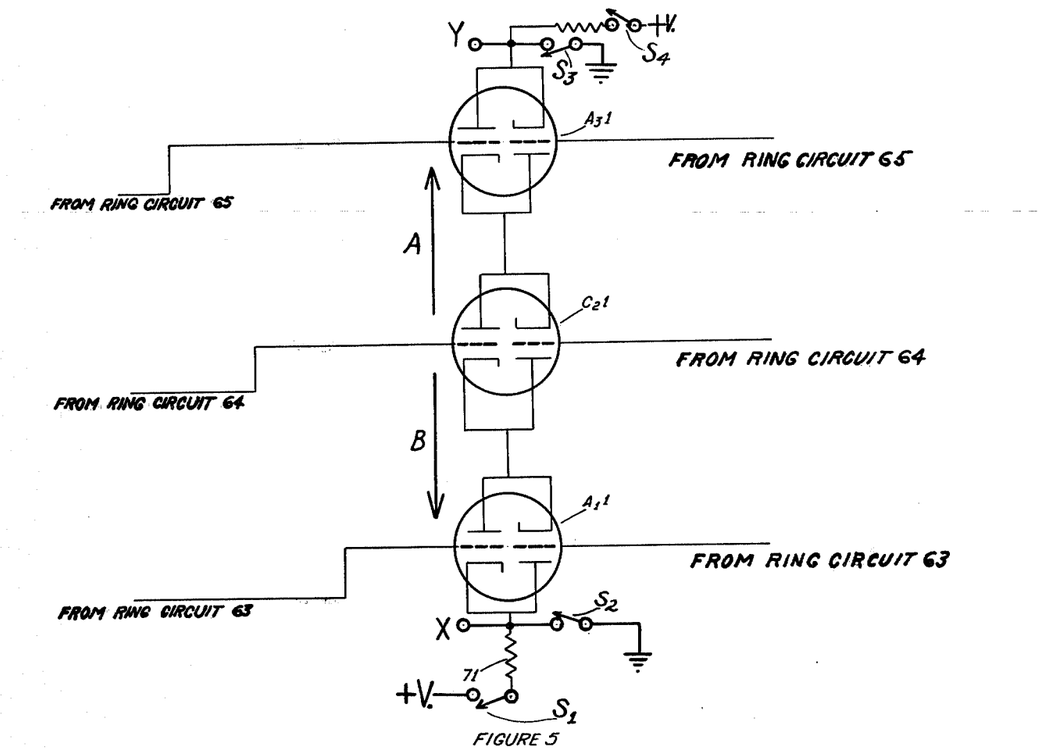
FIG. 5 illustrates in detail the circuits established under certain operating conditions.

The circuits outlined above are shown more in detail in FIG. 5. These are in other words the circuits which are made with letter A. The three tubes, $A_11$, $C_21$, and $A_31$, are normally not conducting but are put in conducting condition by closing switches $S_2$ and $S_4$ (for example), whereupon the tubes will conduct when properly timed pulses are received from the several control circuits 63, 64, and 65, and the signal flow will be in the normal or "forward" direction, as shown by arrow A. For a deciphering operation, or for any special purposes, switches $S_2$ and $S_4$ may be opened, and switches $S_1$ and $S_3$ closed; the signal flow thereupon will be in a reverse direction through the circuit (as shown by arrow B). Switches $S_1$ and $S_3$ obviously can be advantageously located on a single control shaft and switches $S_2$ and $S_4$ on another single control shaft; this forms no part of the invention.

The switching controls (see FIG. 6) are conventional ring circuits and will not be described in detail, it being understood that in the embodiment illustrated each ring comprises five tubes or groups of tubes adapted to fire in some predetermined order. Ring circuits of any size can, of course, be utilized, the designs depending upon the requirements of the apparatus. Circuit 63 is adapted to fire at some predetermined speed, 64 to fire at the same speed but in reverse order, and 65 to fire in the same order as ring 64 but at a reduced speed, for example, one-fifth of the speed of the other two rings. Timing is provided for the control circuits by pulse standard 85 of any desired type. As the tubes of the control circuits conduct, they furnish pulses to predetermined tubes of the several switching circuits 60, 61, and 62.

Figure 6:
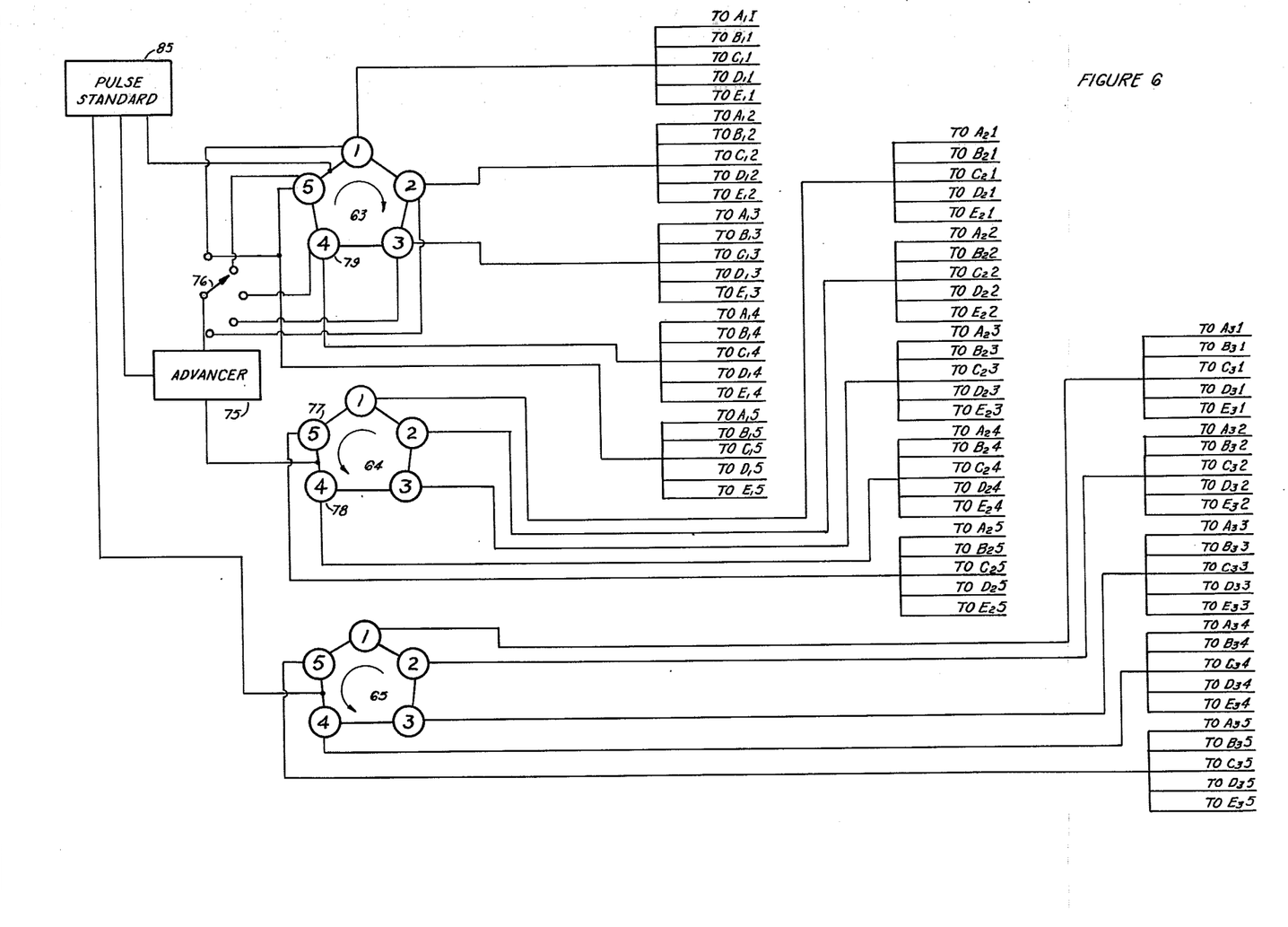
FIG. 6 is a schematic diagram of the organization of switching-circuit controls used in the apparatus.
Figure 7:
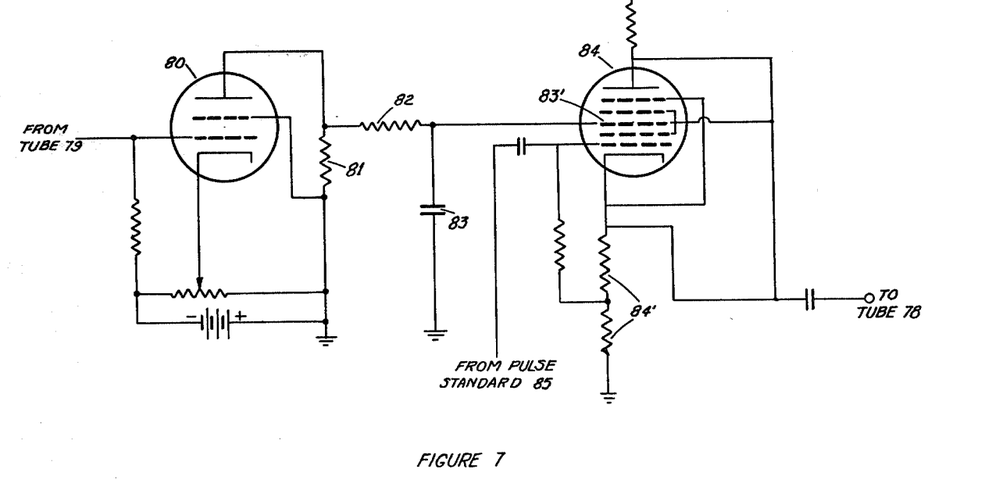
FIG. 7 illustrates a circuit utilized to simulate in the electronic system of my invention the stepping of a rotor in the mechanical combination of FIGS. 1 and 2.

Means are illustrated in FIGS. 3, 6, and 7 for causing a tube of ring 64 to conduct for two time intervals instead of one. These means include a circuit, herein termed an advancer 75, and a variable switch 76. By connecting (through switch 76) a selected tube of circuit 63 (79, for example) to the trigger pulse input of control circuit 64, any tube of the latter circuit, 77, for example, may be caused to conduct for twice its normal interval, the synchronizing pulse to tube 78 being damped out by the pulse from tube 79. The effect is to cause control circuit 64 to lose a step for each cycle of circuit 63, and thus to duplicate the result obtained by stepping the rotor 22 of FIG. 1 one step each time rotor 21 steps five times. By altering switch 76, control circuit 64 can be "stepped" in different time relations with circuit 63.

Figure 8:
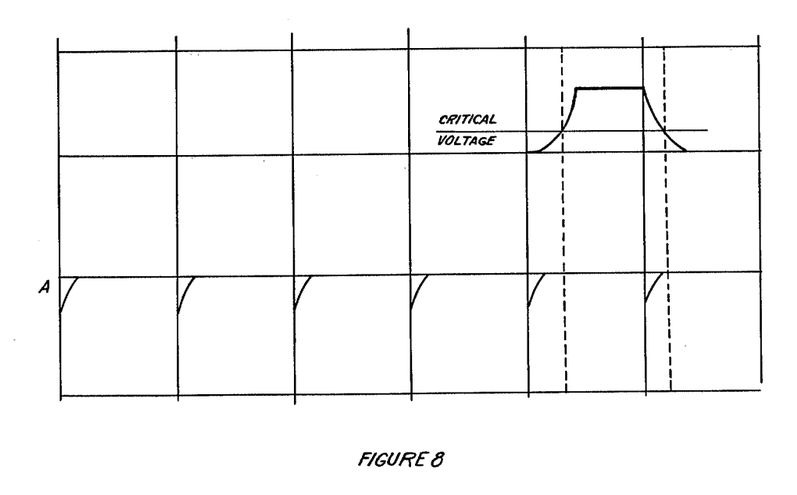
FIG. 8 is a diagram of timing pulses used to control the circuit of FIG. 7.

Referring to FIG. 7, which illustrates advancer circuit 75 in some detail, and FIG. 8, which shows the time relationships between the pulses which control said circuit, neither tube normally conducts. Regular triggering pulses from standard 85, diagramed in FIG. 8 at A, normally produce conduction in tube 84. Whenever tube 84 conducts, the voltage developed across cathode resistor 84' serves to pulse control circuit 64.

When a positive pulse from tube 79 of control circuit 63 reaches the grid of tube 80, the latter tube is caused to conduct. The voltage drop across plate load resistor 81 is impressed across the resistance-capacity network, 82–83, and capacitor 83 assumes a negative charge. This voltage is applied to the second control grid, 83' of tube 84. When it reaches a value required by the design of the circuit, tube 84 cuts off and remains nonconducting until the voltage again falls below the critical voltage, that is the voltage required to hold the tube cut off during a pulse from standard 85.

The time constant of the network, 82–83, is such that the maximum build-up time for capacitor 83, less the time necessary to build up to the critical voltage mentioned, will be slightly greater than the length of one triggering pulse.

An inspection of FIG. 8 will disclose that capacitor 83 reaches the critical voltage after the expiration of one triggering pulse and does not fall below that value until after the expiration of the next. One triggering pulse, therefore, is prevented from reaching switching control circuit 64, and some selected tube, 77 in this case, will continue to conduct until the succeeding pulse is received from standard 85.

Advancer 75 may, of course, be located between control circuits 64 and 65 instead of between 63 and 64, and more than one advancer may be used in some cases. These details depend upon the requirements of the apparatus.

The foregoing description is in specific terms. The invention should not be construed, however, as limited to the exact apparatus and method shown and described. For the true scope of the invention, reference is to be made to the appended claims.

I claim:

1. A circuit for simulating the scrambling of an electromechanical rotor of the type wherein an input to an input contact on one side of the rotor appears on one of a plurality of output contacts on the other side of the rotor in accordance with the wiring among the contacts and with the position of the rotor, which comprises first and second pluralities of switching circuits, means connecting the two pluralities of switching circuits in a manner dictated by the wiring between the input and output contacts of the rotor being simulated, means for applying an input to the first plurality of switching circuits, means for energizing a predetermined switching circuit in each plurality of switching circuits, and means for withdrawing an output from one of the second plurality of switching circuits.

2. An electrical circuit for simulating the scrambling of an electromechanical rotor of the type having a plurality of input and output contacts and wherein a signal applied to each of the input contacts appears on one of the output contacts in accordance with the connections between the input and output contacts and with the position of the rotor, which comprises first and second pluralities of electronic switching means each of which, when rendered conductive, has the effect of closing a switch, means for connecting the two pluralities of switching means in a manner corresponding to the connections between the input and output contacts of the rotor being simulated, means for applying an input signal to the first plurality of switching means, means for rendering conductive a predetermined switching means in each plurality of such means, and means for withdrawing an output from one of the second plurality of switching means.

3. A circuit for simulating the scrambling of an electromechanical rotor of the type wherein fixed inputs that are applied to input contacts on one side of the rotor appear on various ones of output contacts on the other side of the rotor and are applied to fixed outputs in accordance with the wiring of the contacts and the stepping of the rotor, which comprises first and second pluralities of groups of switching circuits, means for connecting one group from each plurality of groups of switching circuits in a manner dictated by the wiring between the input and output contacts of the rotor being simulated, with such connections between different groups corresponding to the rotor wiring as it exists between the fixed inputs and outputs at various ones of the positions to which the rotor can be stepped, means for applying an input to each of the first plurality of groups of switching circuits, means for energizing the switching circuits in predetermined order, and means for withdrawing an output from each of the second plurality of switching circuits.

4. An electrical circuit for simulating the scrambling of an electromechanical rotor of the type wherein the rotor wiring connects fixed input contacts to different fixed output contacts as the rotor is stepped, which comprises first and second pluralities of groups of electronic means each of which, when rendered conductive, has the effect of closing a switch, a plurality of terminal strips wherein each such strip has input and output contacts similar to the fixed contacts and is wired exclusively in accordance with the relative positioning of the rotor to the fixed contacts when in one of the positions to which it can be stepped, means for connecting each group of the first plurality of groups of electronic means to the input contacts of the terminal strips, means for connecting each of a plurality of related output contacts of the terminal strips together and to one of the second plurality of groups of electronic means, means for applying an input to each of the first plurality of groups of electronic means, means for rendering predetermined ones of the electronic means conductive, and means for withdrawing outputs from predetermined ones of the second plurality of groups of electronic means.

5. A circuit for simulating the scrambling of an electromechanical rotor system of the type wherein an internally wired rotor having a predetermined number of paths therethrough is movably positioned between two stators, each of which has a number of contacts equal to the number of paths in the rotor and wherein inputs applied to the contacts of one of the stators appear as outputs on various ones of the contacts of the other stator in accordance with the wiring and the positioning of the rotor, which comprises first and second groups of switching circuits, the number of each of such groups and the number of switching circuits in each group being equal to the number of paths through the rotor, means for connecting a switching circuit from each of the first group of such circuits together and to a second group of switching circuits in an exclusive manner dictated by the wiring of the rotor between the input and output contacts of the stators when the rotor is in one of its different positions, means for closing predetermined ones of the switching circuits, means for applying an input to each of the first groups of switching circuits, and means for withdrawing an output from a predetermined switching circuit in each of the second groups of such circuits.

6. A circuit for simulating the scrambling of an electromechanical rotor system of the type wherein a steppable rotor is coaxially aligned between two stators, wherein each stator has a group of contacts on its end facing the rotor and the rotor has on both of its ends a group of aligned contacts with all such associated contacts when the rotor is in one of its positions being arbitrarily designated respectively as A, B, C, etc., proceeding in one direction therearound, and wherein wiring between the groups of contacts on the ends of the rotor causes an input signal that is applied to one of the contacts of one of the stators to appear as an output on one of the contacts of one of the stators to appear as an output on one of the contacts of the other stator depending upon whether the A contacts of the rotor are aligned with the A contacts of the stator or whether the rotor has been stepped so that the B, C, etc. contacts are aligned therewith, which comprises first and second groups of electronic switching circuits with each of such groups being equal in number to the number of contacts on one of the ends of either one of the stators or the rotor being simulated and wherein the number of switching circuits in each group is also equal to such number, a plurality of groups of terminal strips each of which has related pairs of input and output contacts, means for connecting the pairs of terminal strip contacts in each group of terminal strips in an exclusive manner and similarly as the contacts of the stators are connected by the rotor when the rotor is in one of the various positions to which it can be stepped, the last-mentioned means including means for connecting the pairs of contacts of one terminal strip in accordance with the electrical connections between the stator contacts when the A contacts of the rotors are aligned with the A contacts of the stators and means for connecting those of another terminal strip in accordance with the electrical connections between the stator contacts when the B contacts of the rotor are aligned with the A contacts of the stators, means for connecting each of the first group of switching circuits to the input contacts of one of the groups of terminal strips, means for connecting the output contacts of the terminal strips that relate to the A, B, C, contacts of the stators together and to an exclusive one of the second group of switching circuits, means for energizing predetermined ones of the two groups of electronic switching circuits in predetermined order and for a length of time equal to the length of time that the rotor remains in the various positions to which it is stepped, means for applying a series of input signals, similar to those applied to each contact of a stator of the system being simulated, to each of the first groups of switching circuits, and means for withdrawing output signals from predetermined ones of the second groups of switching circuits.

7. A circuit for simulating the scrambling of an electromechanical rotor system of the type wherein a plurality of rotors are wired to scramble an input signal which is applied thereto, which comprises a plurality of groups of switching circuits, means for connecting the groups of the switching circuits successively with each pair of adjacent groups in the series being connected in a manner dictated by the wiring of one of the rotors in the system being simulated, means for applying an input signal to the first group of switching circuits in the series, means for energizing a predetermined switching circuit in each group of such circuits, and means for withdrawing an output signal from the last group of switching circuits in the series.

8. A circuit for simulating the scrambling of an electromechanical rotor system of the type wherein each of a plurality of serially connected rotors is stepped between fixed input and output contacts and wherein the wiring of each rotor connects each fixed input contact associated therewith to a different associated fixed output contact as the rotor is stepped, which comprises a plurality of groups of switching circuits, means for connecting the plurality of groups of switching circuits in a series, the last-mentioned means including a terminal strip for connecting adjacent groups of switching circuits, with each such terminal strip having input and output contacts, and means for electrically connecting the input and output contacts of each terminal strip in an exclusive manner and in accordance with the relative positioning of one of the rotors being simulated to the fixed contacts associated therewith when the rotor is in all of the positions to which it can be stepped, means for applying input signals to the first group of switching circuits in the series, means for energizing predetermined ones of the switching circuits, and means for withdrawing output signals from the last group of switching circuits in the series.

* * * * *